United States Patent [19]
Labedz

[11] Patent Number: 6,119,010
[45] Date of Patent: Sep. 12, 2000

[54] METHOD AND APPARATUS FOR ADJUSTING CHANNEL POWERS IN A WIRELESS COMMUNICATION SYSTEM BASED ON A PREDICTED MOBILE LOCATION

[75] Inventor: Gerald P. Labedz, Chicago, Ill.

[73] Assignee: Motorola, Inc., Schaumburg, Ill.

[21] Appl. No.: 09/170,553

[22] Filed: Oct. 13, 1998

[51] Int. Cl.[7] .................................................. H04Q 7/20
[52] U.S. Cl. ........................................... 455/446; 455/456
[58] Field of Search ........................... 455/552, 63, 67.1, 455/68, 446, 424, 423, 425, 69, 456; 370/342, 347, 335

[56] References Cited

U.S. PATENT DOCUMENTS

| | | | |
|---|---|---|---|
| 5,265,119 | 11/1993 | Gilhousen | 375/1 |
| 5,561,841 | 10/1996 | Markus | 455/33.1 |
| 5,590,409 | 12/1996 | Sawahashi et al. | 455/69 |
| 5,627,834 | 5/1997 | Han et al. | 370/241 |
| 5,812,540 | 9/1998 | Bruckert et al. | |
| 5,966,661 | 10/1999 | Bernardin et al. | 455/446 |

Primary Examiner—Nguyen Vo
Assistant Examiner—Naghmeh Mehrpour
Attorney, Agent, or Firm—Kenneth A. Haas

[57] ABSTRACT

The present invention provides a method of adjusting channel powers during operation of a wireless communication system. A relatively few pieces of operating data are obtained from the wireless communication system and simulation techniques are used to identify potential system performance problems. A revised set of channel powers are formulated to correct the potential system performance problems. The performance improvement of the revised set of channel powers is verified using simulation techniques, and then the revised set of channel powers is implemented in the wireless communication system.

17 Claims, 3 Drawing Sheets

METHOD AND APPARATUS FOR ADJUSTING CHANNEL POWERS IN A WIRELESS COMMUNICATION SYSTEM BASED ON A PREDICTED MOBILE LOCATION

FIELD OF THE INVENTION

The present invention relates generally to wireless communication systems, and more particularly, to a method for adjusting channel powers in a wireless communication system.

BACKGROUND OF THE INVENTION

A cellular communication system is a complex network of systems and elements. A minimum number of elements include 1) a radio link to the subscriber units (cellular telephones or mobiles) which is usually provided by at least one and typically several base transceiver stations (BTS), 2) communication links between the base transceiver stations, 3) a controller, typically one or more base station controllers or centralized base station controllers (BSC/CBSC), to control communication between and to manage the operation and interaction of the base transceiver stations, 4) a call controller or switch, typically a mobile switching center (MSC), for routing calls within the system, and 5) a link to the land line or public switched telephone system (PSTN) which is usually also provided by the MSC.

One aspect of designing a wireless communication system requires selecting geographic locations of base stations and associated service areas. Several requirements of the design include ensuring that certain radio frequency channels, such as pilot, page and sync channels, are present in each service area, while further ensuring interference with other service areas is minimized.

Typically, pilot-channel powers at each base station are manually adjusted, while page- and sync- channel powers are automatically scaled to the manually adjusted pilot-channel power levels. Traffic-channel power limits may also be automatically scaled to the adjusted pilot-channel power levels. For simplicity, pilot-, page- and sync-channel powers are referred to collectively herein as pilot-channel powers, although it is contemplated that the term pilot-channel power may apply to one or more such channels or to any similar type of channel. Although it is possible to select a specific pilot-channel power, prediction of the actual signal propagation pattern of the pilot-channel may be difficult where the signal may be reflected in unanticipated directions, resulting in insufficient signal strength in a base station's designated service area and/or unacceptable levels of interference in neighboring service areas. For example, setting one or more pilot-channel powers too high may cause too many pilot-channel signals to be present at various locations throughout the system, and may hinder a mobile's ability to select the best pilot-channel from a pathloss perspective. This may have a particularly detrimental effect on soft handoff performance of the system. It may also cause the signal-to-noise ratio from all of the pilot-channel powers at a particular location to be unacceptable.

As will be appreciated, manual assignment of pilot-channel powers is time consuming and expensive in that assignments must be made, field tested and revised repeatedly to obtain complete coverage and acceptable interference levels for each service area in the communication system. An automated method of setting pilot-channel powers is described in commonly-assigned U.S. patent application Ser. No. 08/884,965, filed Jun. 30, 1997, entitled "Method for Automatically Selecting Channel Powers in a Wireless Communication System" the disclosure of which is hereby expressly incorporated herein by reference. The automated method disclosed in the aforementioned United States patent application is further useful in making subsequent pilot-channel power settings and/or revisions to the existing pilot-channel power settings. However, each set of pilot-channel power settings remains "static" from a system operation standpoint. That is, in real-time, during operation of the wireless communication system, the current set of pilot-channel power settings remains unchanged. Changes to the active set of pilot-channel powers occurs infrequently, and then usually only as a result of a significant change in the wireless communication system, for example, cell addition, topology change, etc.

Thus, even with the improvement in pilot-channel power assignment offered in U.S. patent application Ser. No. 08/884,965, the static set of pilot-channel powers is a compromise and cannot simultaneously make all areas of the system "good" during system operation. The static set seeks the best condition over as many areas at once simultaneously, but does not account for current areas of high and low traffic density, i.e., where the mobiles are located, at any given point in time. In addition, pilot-channel power settings based on a single distribution or average of distributions for a particular cellular system design, i.e., cell locations, sector antenna characteristics and covered terrain, may leave some important areas not properly served as the traffic moves around and changes the noise at each base (reverse link) and at each location (forward link) in the system. The phrase "not properly served" is used to refer to the instance in which the service area is either under covered or over covered. An under covered service area lacks pilot-channels of sufficient number and power to properly service the mobiles operating in the coverage area. An over covered service area may have so many pilot-channels impinging on a given area as to require the mobile to switch more rapidly than the control system can measure and message just to remain connected to a good one. An over covered service area may also have too many pilot-channels of significant power where no one is sufficient due to the presence of the others and other noise sources. That is, no one pilot-channel stands out for the mobile to select. The result of poorly adjusted pilot-channel power is dropped calls, failed handoffs, system unavailability and system underutilization.

Thus, there is a need for a method of adjusting channel powers within a wireless communication system during operation of the wireless communication system.

DETAILED DESCRIPTION OF THE PREFERRED EMBODIMENTS

The present invention provides a method for adjusting pilot-channel powers in a wireless communication system during system operation utilizing a power adjustment strategy in conjunction with real-time system data. Several preferred embodiments of the present invention are described in terms of adjusting pilot-channel powers in a code division multiple access (CDMA) digital cellular communication system. It will be appreciated that the present invention has application to other system types and may, for example, by applied to adjusting broadcast control channel power and traffic channel power in a Global System for Mobile communications (GSM) digital cellular communication system.

The present invention recognizes unexpectedly that a relatively few pieces of data, readily available during operation of the wireless communication system, may be used to determine that an existing set of pilot-channel power settings may lead to problem with continued system operation. In accordance with a preferred embodiment of the present invention, a revised set of pilot-channel power settings is established and checked to ensure the revised set results in a sufficient improvement in system operation. Then, the revised set of pilot-channel powers are implemented in the wireless communication system by accordingly instructing the base transceiver stations to adjust pilot-channel power. In fact, it has been recognized that as few as two pieces of input data provides an unexpectedly accurate representation of system operation by using system simulation techniques. The use of a relatively small number of input data simplifies the evaluation of system performance such that problem identification, solution and verification may be accomplished substantially continuously and in real-time. It will be appreciated that, although described in terms of revising pilot-channel power settings, the present invention has application to virtually any operating parameter of the wireless communication system using appropriate available data.

In an additional aspect of the present invention, system history data is gathered and retained. The system history data, representing such things as past system operation and performance, is utilized in both establishing revised pilot-channel power settings and in determining if the revised set of pilot-channel power settings results in improved system performance. The system history data is further used to identify problem areas of the wireless communication system, areas in which adjustments are frequently required or where adjustments are ineffective for achieving a desired level of system performance. These problem areas may then be reported to the wireless system operator for further system engineering and evaluation in order to obtain a more permanent solution.

Figure 1:
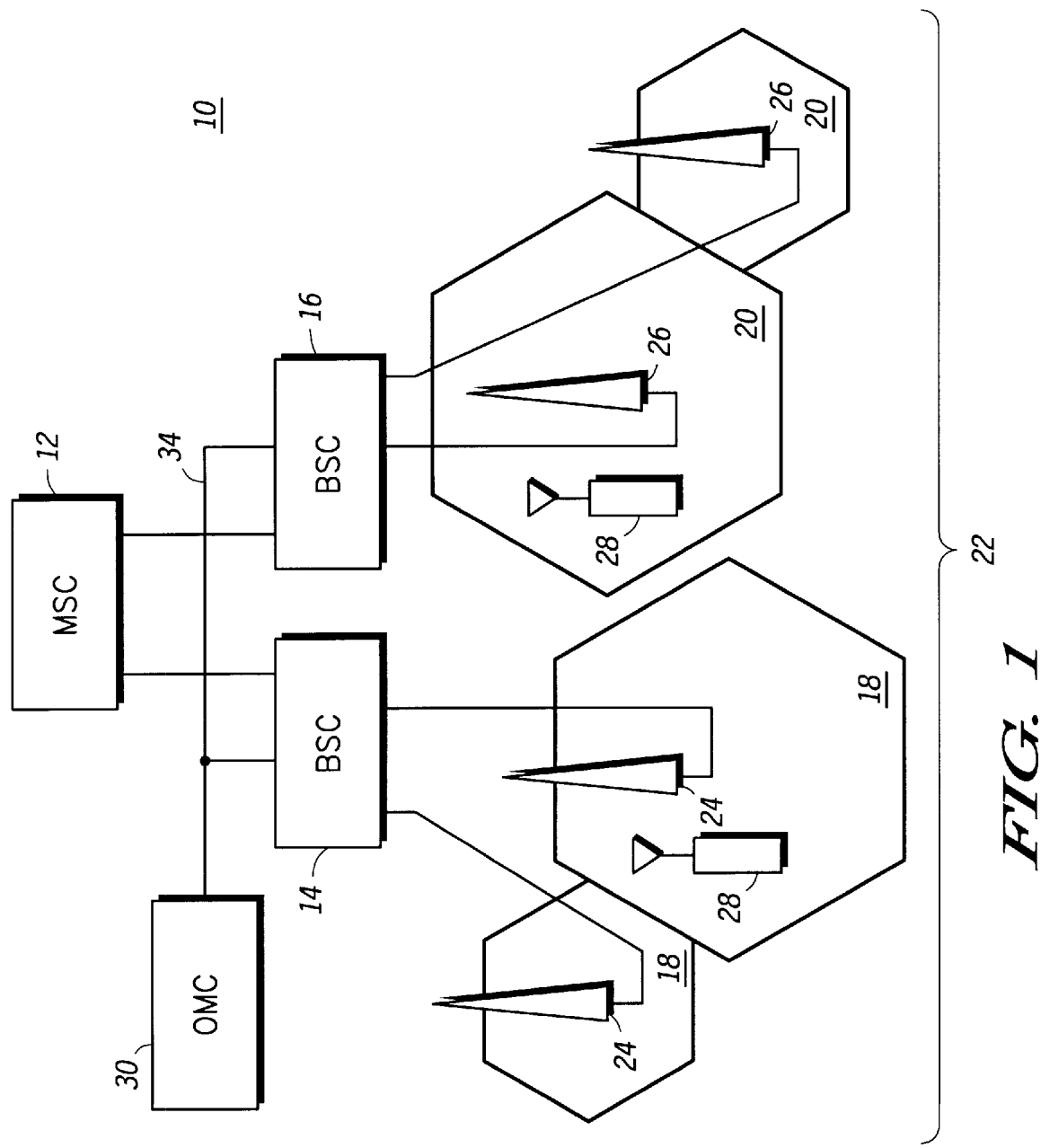
FIG. 1 is a block diagram representation of a wireless communication system that may be adapted to operate in accordance with the preferred embodiments of the present invention.

As noted, the present invention is described in terms of several preferred embodiments, and particularly, in terms of a wireless communication system operating in accordance with at least one of several communication standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95A Code Division Multiple Access (CDMA) digital cellular, the Personal Communications System (PCS) and variations and evolutions of these protocols. As shown in FIG. 1, a wireless communication system 10 includes a mobile switching center (MSC) 12, a first base station controller (BSC) 14 and a second BSC 16 servicing a total service area 22. As is known for such systems, each BSC 14 and 16 has associated therewith a plurality of base transceiver stations (BTSs), 24 and 26, respectively servicing communication cells, or service areas, generally shown as cells 18 and cells 20, respectively. It will be appreciated that additional or fewer cells may be implemented as required and without departing from the fair scope of the present invention. MSC 12, BSCs 14 and 16, and BTSs 24 and 26 are specified and operate in accordance with the applicable standard or standards for providing wireless communication services to mobile stations ("mobiles") generally shown as 28 operating in cells 18 and 20 and each of these elements are commercially available from Motorola, Inc. of Schaumburg, Ill.

Also shown in FIG. 1 and coupled respectively to BSC 14 and BSC 16 is an operations and maintenance center (OMC) 30. It will be appreciated that a single OMC may service multiple BSCs, and the actual number of OMCs in system 10 will depend on its size. For example, a small system may require only a single OMC to which all of the BSCs are coupled, while a large system may include several OMCs. The OMC 30 includes an interface 34 to wireless communication system 10, and particularly to BSC 14 and BSC 16, respectively. It will be appreciated that OMC 30 may directly or indirectly interface with other elements of wireless communication system 10 or with multiple elements, and that specialized OMCs for each of the radio communications portion, i.e., the BTSs and BSCs, and the switch portion, i.e., the MSC, of communication system 10 may be provided. Interface 34 provides a gateway for observing operation of and gathering data from communication system 10. Interface 34 is also used to communicate control and other information to elements of communication system 10, and in this regard, interface 34 functions as is well known in the art for an OMC of a wireless communication network. OMC 30 also contains processing capabilities and memory which may be readily adapted to implement the present invention. Of course, other suitable system entities having suitable processing and memory capability may also be so adapted.

Multiple access wireless communication between base stations 24 and 26 and mobiles 28 occurs over radio frequency (RF) channels which provide physical paths over which communication signals such as voice, data and video are transmitted. Base station-to-mobile communications are said to occur on a forward-link channel, while mobile-to-base station communications occur on a reverse-link channel.

A communication system using code division multiple access (CDMA) channelization is suitable for use with the various embodiments of the present invention. Such a communication system is well known and described in detail in *TIA/EIA Interim Standard IS-95A, Mobile Station-Base Station Compatibility Standards for Dual-Mode Wideband Spread Spectrum Cellular Systems*, Telecommunications Industry Association, Washington, D.C. July 1993 (IS-95A), and all addenda and revisions thereto, including but not limited to *TIA Telecommunications Systems Bulletin: Support for 14.4 kbps Data Rate and PCS Interaction for Wideband Spread Spectrum Cellular Systems*, ("the Bulletin"), February 1996, and *TIA/EIA Interim Standard IS-96*, (IS-96), the disclosures of each of which are hereby expressly incorporated herein by reference. Another communication system using CDMA channelization is described in *TIA/EIA Interim Standard IS-99, Data Services Option Standard fro Wideband Spread Spectrum Digital Cellular Systems*, (IS-99), Telecommunication Industry Association, Washington, D.C., also incorporated herein by reference.

In a CDMA based communication system, such as communication system 10, mobiles 28 transmit and receive communication signals over a common frequency spectrum. Specialized codes, such as Walsh codes, are used for separating multiple communication signals from one another in system 10. Each specialized code typically represents one communication channel within the common frequency spectrum. A communication channel may be, among other things, a pilot channel, a paging channel, a sync channel, a traffic channel or part of a traffic channel.

Each base station 24 and 26 includes, among other things, a plurality of transceivers (not depicted), which provide communication channels (e.g., a radio frequency link f1 through fn, along with a code such as a Walsh code) for communication between mobiles 28 and base stations 24 and 26. Communication channels may also refer to combinations of frequencies and codes, time slots such as in a time division multiple access (TDMA) system or combinations of frequencies and time slots. In the herein described preferred embodiments of the present invention, radio frequency channels are understood to refer to channels in a code-based radio-frequency communication system. Some communication channels, such as pilot channels, are dedicated to providing control and signaling information. Base stations 24 and 26 may also include an antenna (not depicted) which transmits and receives communication signals. The antenna may be any type, for example, directional beam, uni-beam, omni-beam, patch or array. The transmit power and/or phasing may be controlled and varied using various well-known techniques.

During the planning of system 10, the geographic locations of base stations 24 and 26 and the approximate boundaries of cells 18 and 20 may be determined manually or using various tools such as Motorola's Netplan™ system planning tool. Shapes and sizes of cells 18 and 20 vary as a function of topology, availability of sites to place antennae and traffic congestion.

In addition to the physical layout of system 10, an initial set of radio frequency channel values, such as pilot-channel power settings, are established preferably using the method disclosed and described in the afore-mentioned United States patent application. For each pilot-channel signal, an amount of pathloss (i.e., an amount of attenuation of the signal power) and a delay spread (i.e., the time delay) of the pilot-channel signal that occurs from the given base station 24 or 26 to particular points within system 10 is determined. A number of reference points are established within system 10 and are typically associated with roads, buildings and other key structures. The pathloss and delay data is then retained within system 10 in the form of pathloss and delay maps. Pathloss and delay calculations may be based upon actual or measured data, or may be predictions based upon well-known models.

To ensure accurate operation of system 10, it is important that a desirable number of pilot-channels are receivable by mobiles 28 at any point within system 10. It is known that for currently available CDMA mobiles a near optimum number of receivable pilot-channels for locations throughout a CDMA communication system is between one and three. This is because the currently available mobiles are able to lock onto three pilot-channels simultaneously. Future mobiles may have capability to acquire and lock onto more than three. Additional pilot-channel signals impinging on a given point may interfere with the three best pilot-channels, effectively decreasing the coverage at that particular point. Too few pilot-channel signals impinging on a given point may result in dropped calls and/or service interruptions. However, static pilot-channel power settings may result in fewer or more than the optimum pilot-channel signals impinging on a point given the current cell load.

Figure 2:
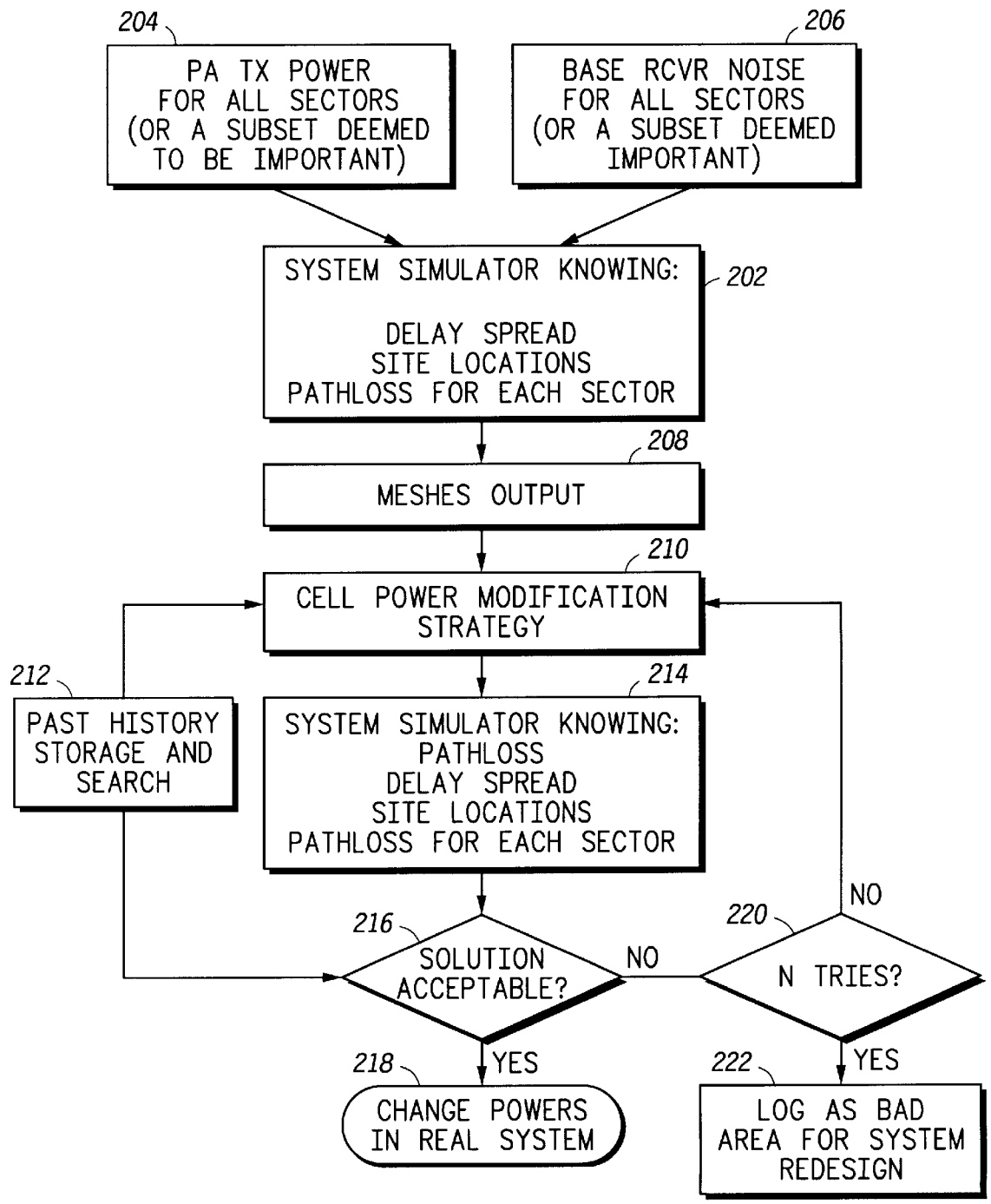
FIG. 2 is a flow chart illustrating a method for adjusting channel powers in a wireless communication system in accordance with a preferred embodiment of the present invention.

In accordance with the preferred embodiments of the present invention, and with reference to FIG. 2, a method 200 for adjusting pilot-channel power settings is illustrated. It will be appreciated that method 200 may be implemented within any suitable control entity of system 10, and preferably is implemented in association with OMC 30, which includes suitable memory and processing capability for performing the following described steps.

Method 200 begins at step 202 with a simulation of the current performance of system 10. A minimum number of data inputs are required for the simulation, and at step 204 the current power amplifier transmit (PA Tx) power for each cell, or an important subset of cells, is obtained and at step 206 the receiver noise at each cell, or an important subset of cells, is obtained. A preferred simulation is disclosed and described in commonly assigned U.S. patent application Ser. No. 08/702,423, filed Aug. 14, 1996 and entitled "Method of Controlling a Communication System", and the disclosure of this patent application is hereby expressly incorporated herein by reference. Of course, other suitable system simulation techniques may be employed. The result of the simulation are a plurality of parameter meshes, step 208. Parameter meshes are, simply put, the calculation of a particular parameter for each x, y coordinate of a grid covering the area of interest. As noted in application Ser. No. 08/702,423, the parameter meshes are calculated over the total service area 22, a designated portion thereof, for a number of different conditions to form a mesh set, and the mesh set is then evaluated to determine system performance.

One of ordinary skill in the art will appreciate that numerous parameter meshes may be calculated in order to obtain system performance information. Several relevant parameter meshes include: 1) forward link power requirement, 2) reverse link power requirement, 3) the number of useful pilot-channel signals and 4) best pilot signal. Forward link power requirement is, in consideration of, but not limited to, mobile speed, delay spread and likely handoff connections, the power required to maintain a signal connection at a predetermined quality level. Quality level is typically defined for CDMA systems in terms of frame erasure rate (FER). Reverse link power requirement is similar to the forward link power requirement but in the mobile-to-base station direction. The number of useful pilot-channel signals is calculated for each point by calculating the IS-95A quantity Ec/Io (i.e., the ratio of the pilot-signal power to the total received energy) for each pilot-channel signal and, if the ratio passes a preset threshold, counting the pilot-channel signal as useful. Similarly, a mesh is calculated to identify the best pilot signal, again by calculating the ratio Ec/Io.

The meshes form the input to a pilot-channel power modification strategy, step 210, which receives as a further input past history data, step 212. The history data represents conditions or sets of conditions that suggest a potential system performance problem. Present conditions, based upon the parameter meshes, may be compared to the history data to identify impending system performance problems, and therefore permit preemptive corrective action. Initially, history data for system 10 may be generated using simulation and other techniques. For example, numerous short simulation runs may be made and/or a relatively few long simulations runs may be made. As system 10 is operated, actual data may be used to augment/enhance/correct the existing history data. Thus by evaluating the meshes data, step 208, in view of the history data, step 212, a potential system performance problem may be identified, and a pilot-channel power modification strategy may be employed, step 210, to preemptively correct the problem.

As noted before, and worth noting again, the preferred embodiments described herein refer to adjusting pilot-channel power settings, but it will be appreciated that other system operating parameters may be adjusted in accordance with present invention. Pilot-channel power settings were selected to illustrate the principles of the present invention as it is known that revising the pilot-channel power settings has a readily discernible impact on system performance. However, the present invention proposes an intelligent control strategy with the goal of preempting potential problem situations. Therefore, should the conditions suggest a call may be dropped, instead of or in addition to modifying pilot-channel power settings, system 10 may cause a hand off of the mobile, even before the mobile requests the hand off and/or before scan information becomes available. It will be appreciated that other operating strategies may be employed without departing from the fair scope of the present invention.

Modification of the pilot-channel power settings have far reaching ramifications on the present performance of system 10. Therefore, once a revised set of pilot-channel power settings is obtained at step 210, a second simulation, step 214, is conducted to verify the revised set of pilot-channel power settings results in an improved system performance. The results of the second simulation, again parameter meshes, are evaluated in view of the history data to determine that a satisfactory result was indeed obtained, step 216.

The importance of the second simulation, step 214, and the evaluation, step 216, cannot be overlooked. Turning up a pilot-channel power in one cell to save an ongoing call, for example, may cause another cell or cells of system 10 to significantly degrade. However, if there is little or no traffic in those cells at that time, it may not matter that performance has been degraded. And, since it is the intent to continuously revise the pilot-channel power settings, should traffic conditions change in those cells, a further revised set of pilot-channel power settings can be established. These determinations are advantageously made by observing the present base station transmit power and the present receiver noise level in conjunction within the previously known pathloss and delay spread maps.

If the outcome of the evaluation step 216 suggests an acceptable level of improvement, the revised set of pilot-channel power settings is implemented with appropriate instructions being sent to each base station 24 and 26 in system 10, step 218. Otherwise, up to N attempts to arrive at a revised set of pilot-channel power settings are made, step 220. If after N tries, an acceptable set cannot be obtained, the offending portion of system 10, i.e., the portion of system 10 for which performance improvement cannot be obtained, is noted as a "bad area", step 222, which may require system redesign.

Referring back to step 210, one will appreciate that numerous strategies for adjusting pilot-channel power settings may be employed. Several examples are provided by way of illustration, and should not be taken as limiting. For example, there are at least two strategies for closing a coverage hole, i.e., inadequate pilot-channel signal. A first strategy is to turn-up one or more pilot-channel powers. The cell with the lowest path loss to the area in question, based on the pathloss map, and lowest load is preferably turned up. Turning up this cell will effect other cells the least, based on the pathloss data, and because it has the lowest load, it is capable of accepting additional traffic.

Where the coverage hole is created because there are too many pilot-channel signals impinging on an area none of which is dominant, one or more pilot-channel power settings is again turned up. The candidate cells include those with the lowest path loss to the area and the lowest load. Again, these cells will effect the others the least, and can handle the additional load. If turning up a pilot-channel power setting provides unacceptable results, for example, causes another area of system 10 to become unacceptably bad, a second strategy is to turn down one or more pilot-channel power settings into the area until one pilot-channel dominates the area.

Another potential problem condition results where there is again over coverage, but no Ec/lo failure. Several pilot-channels may have alternating strengths over a small span in space. The problem is the control system may not be fast enough to move the mobile pilot connecting around fast enough to keep the call going. A solution is to make one pilot-channel clearly dominant. The cell with the lowest path loss to the area is selected, and its pilot-channel power is raised until its Ec/lo is better than the other cells.

It is important to know the peak load of a cell when determining whether to turn up or turn down a pilot-channel power setting. Peak load is determined using simulation techniques. This peak load data, forming part of the history data, is then utilized in the pilot-channel power adjustment strategy.

Pilot-channel power settings may be increased or decreased in fixed increments, or other adjustment criteria may be established for increasing and decreasing the power setting. After each revised set of pilot-channel power settings is obtained, the simulation step, step 214, and the evaluation step, step 216, are repeated to ensure that an overall improvement in system performance was achieved. An improvement in system performance may mean in some areas of system 10 having low traffic volume performance has degraded while in areas of high traffic volume an improvement is noted. The physical effect of changing pilot-channel power settings may include an expansion of certain service areas and/or a contraction of other service areas. This is illustrated in FIG. 1, wherein cells 18 and 20 are shown of various sizes and distributions with respect to base stations 24 and 26.

Figure 3:
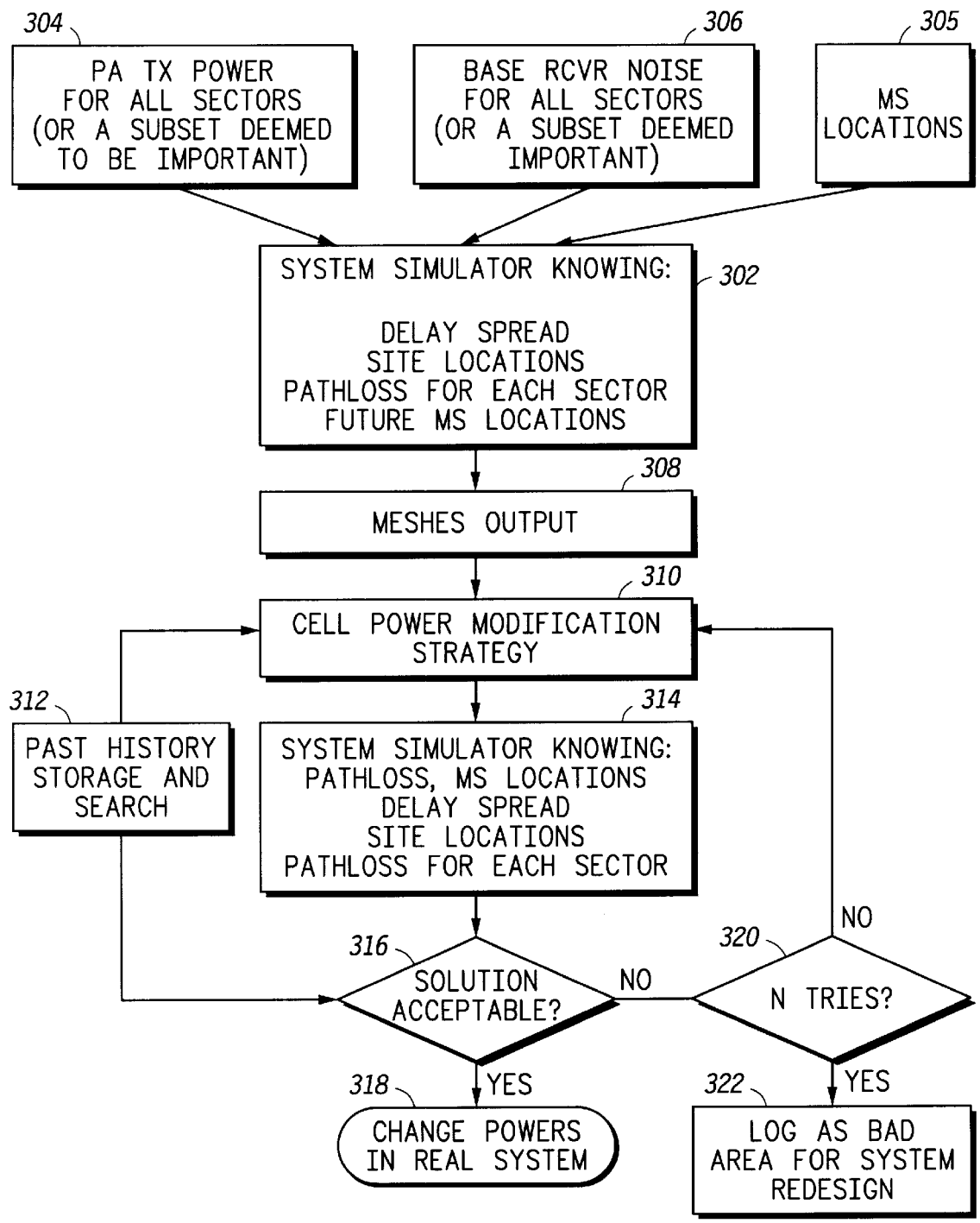
FIG. 3 is a flow chart illustrating a method for adjusting channel powers in a wireless communication system in accordance with an alternate preferred embodiment of the present invention.

With knowledge of the location and speed of the mobiles, an enhanced method 300 shown in FIG. 3 may be employed for adjusting pilot-channel signal powers. Method 300 is similar to method 200 with several exceptions noted below. Method 300 includes as inputs, in addition to current power amplifier transmit power, step 304, and receiver noise level, step 306, present mobile location information, step 305. These data are input to simulation step 302 which, in addition to the preferred simulation described with respect to step 202 of method 200, further includes a full motion simulator with mobile location predictor capability. A suitable location predicator may use linear extrapolation to determine mobile positions over a period of time. This provides an realistic indication of mobile positioning and cell connections. The output of simulation step 302 is again parameter meshes 308. The parameter meshes form an input to pilot-channel power setting modification strategy 310, along with history data 312. The output of strategy 310 is a revised set of pilot-channel power settings, which are input to simulation step 314. Simulation step 314 utilizes the additional information relating to predicted/future locations of the mobiles and is thus capable of more accurately determining transmit power amplifier transmit powers and receiver noise. The simulation output is evaluated, step 316, and if an acceptable improvement in system performance is obtained, the revised set of pilot-channel power setting is implemented. Otherwise, N tries, step 320, are made to improve system performance and if still unsuccessful, the offending area is marked as a bad area need system redesign, step 322.

The strategies described above with respect to step 210 are suitable for use at step 310. Of course additional strategies may also be implemented. One such strategy may provide for generating sets of revised pilot-channel power settings for respective future time periods which may be based at least in part on present and predicted mobile locations. These sets of pilot-channel power settings may then be implemented during the appropriate time periods. Additional simulation is also conducted to verify the conditions leading to the set of revised pilot-channel power settings still hold.

Many changes and modifications could be made to the invention without departing from the fair scope and spirit thereof. The scope of some changes is discussed above. The scope of others will become apparent from the appended claims.

I claim:

1. A method of controlling operation of a wireless communication system comprising during system operation:

obtaining data from the communication system, wherein the step of obtaining data comprising obtaining at least one of: a transmit power, a receiver noise, a mobile present location, and a mobile future location;

generating a simulated system performance using the data;

predicting a future mobile locations using the present mobile location determining a plurality of system adjustments for future mobile locations from the simulated system performance;

generating an adjusted simulated system performance for a future time period using the future mobile location and the system adjustments for future time periods; and adjusting the communication system in accordance with the system adjustment when the adjusted simulated system performance indicates a performance improvement.

2. The method of claim 1, the step of obtaining data comprising obtaining at least one of: transmit power and receiver noise.

3. The method of claim 1, wherein the system adjustment comprises a channel power adjustment.

4. The method of claim 1, wherein the step of determining a system adjustment comprises implementing a channel power adjustment strategy.

5. The method of claim 1, further comprising the step of providing history data and the step of determining a system adjustment further comprises using the system history data.

6. The method of claim 5, further comprising the step of evaluating the adjusted system performance using the history data.

7. A method of adjusting channel power settings during operation of a wireless communication system comprising the steps of:

obtaining present mobile location data from the wireless communication system, using the system data and simulation techniques to determine a potential system performance problem, wherein the simulation technique includes future mobile location prediction capability;

formulating revised channel power settings, the revised channel power settings based at least in part on history data and predicted future mobile locations;

using the simulation techniques to determine if the revised channel power settings provide a performance improvement; and implementing the revised channel power settings.

8. The method of claim 7, the data comprising at least one of: delay spread data, site location data, and sector path loss data.

9. The method of claim 7, the data comprising at least one of transmit power and receiver noise.

10. The method of claim 7, the step of formulating revised channel power settings comprising increasing at least one channel power setting.

11. The method of claim 8, the step of formulating revised channel power settings comprising decreasing at least one channel power setting.

12. The method of claim 7, the potential system performance problem comprising an under covered area, and the step of formulating revised channel power settings comprising increasing at least one channel power setting.

13. The method of claim 7, the potential system performance problem comprising an over covered area, and the step of formulating revised channel power settings comprising increasing at least one channel power setting.

14. The method of claim 7, the potential system performance problem comprising an over covered area, and the step of formulating revised channel power settings comprising decreasing at least one channel power setting.

15. The method of claim 7, the system comprising one of a code division multiple access communication system and a time division multiple access communication system.

16. The method of claim 7, further comprising the step of identifying areas of the wireless communication system requiring repeated channel power setting adjustment.

17. The method of claim 7, further comprising the step of identifying areas of the wireless communication system for which the revised channel power settings do not provide an improved system performance.

* * * * *